US008764432B2

(12) United States Patent
Thunholm

(10) Patent No.: US 8,764,432 B2
(45) Date of Patent: Jul. 1, 2014

(54) HIGH-PRESSURE PRESS

(75) Inventor: Roger Thunholm, Västerås (SE)

(73) Assignee: Avure Technologies AB, Vasteras (SE)

( * ) Notice: Subject to any disclaimer, the term of this patent is extended or adjusted under 35 U.S.C. 154(b) by 0 days.

(21) Appl. No.: 13/513,986

(22) PCT Filed: Jan. 7, 2010

(86) PCT No.: PCT/EP2010/050108

§ 371 (c)(1),
(2), (4) Date: Jun. 5, 2012

(87) PCT Pub. No.: WO2011/082825

PCT Pub. Date: Jul. 14, 2011

(65) Prior Publication Data

US 2012/0269920 A1 Oct. 25, 2012

(51) Int. Cl.
*B29C 43/10* (2006.01)
*B22F 3/15* (2006.01)

(52) U.S. Cl.
USPC ........ 425/405.2; 425/815; 432/199; 432/205; 432/233

(58) Field of Classification Search
USPC ...................... 425/405.2, 815, 77–78, 73–74; 432/199, 205, 233, 249
See application file for complete search history.

(56) References Cited

U.S. PATENT DOCUMENTS 4,532,984 A * 8/1985 Smith, Jr. ...................... 432/205
6,250,907 B1 * 6/2001 Bergman ................... 425/405.2
7,011,510 B2 3/2006 Nakai et al.
8,449,279 B2 * 5/2013 Nakai et al. ..................... 425/78
8,506,284 B2 * 8/2013 Bergman ................... 425/405.2
2007/0228596 A1 10/2007 Fujikawa et al.

FOREIGN PATENT DOCUMENTS

DE 3833337 4/1990
EP 1162718 A2 12/2001
EP 1286448 A1 2/2003
EP 1408601 A2 4/2004
JP 01230984 A 9/1989
JP 2007-203463 A 10/2007

OTHER PUBLICATIONS

International Search Report PCT/ISA/210.
Written Opinion PCT/ISA/237.
Japanese Office Action issued in Patent Application No. 2012-547457, mailed Jan. 7, 2014, with English translation.
Japanese Utility Model Application No. 62-013622 (Jpn. UM Appln. KOKAI Publication No. 63-123999) (Dec. 8, 1988).

* cited by examiner

*Primary Examiner* — Joseph S Del Sole
*Assistant Examiner* — Thukhanh Nguyen
(74) *Attorney, Agent, or Firm* — Harness, Dickey & Pierce, P.L.C.

(57) ABSTRACT

A high-pressure press is disclosed which includes a high-pressure vessel enclosing a high-pressure chamber and a high-pressure medium; a housing, separating a volume from the high-pressure press chamber, arranged for holding a fluid; a fan arranged in the high-pressure press chamber outside the housing for circulating the high pressure medium in the high-pressure press chamber; a motor, arranged in the housing and operatively connected to the fan for driving the fan; a cooling device for cooling a portion of the housing wall; and a pumping device arranged for circulating the fluid, the fluid providing a transfer of cold from the portion of the housing wall to the motor, the cooled circulation of the fluid being separated from the high-pressure press chamber by the housing.

14 Claims, 2 Drawing Sheets

HIGH-PRESSURE PRESS

FIELD OF THE INVENTION

The present invention relates to a high-pressure press for holding articles to be pressed. In particular, the invention relates to the cooling of a motor provided in the high-pressure press.

BACKGROUND OF THE INVENTION

High-pressure presses are often used for the densification of powdered or cast materials, such as e.g. turbine blades, to achieve elimination of material porosity. Thus, the pressing is applied to an article placed in the press in order to substantially increase the service life and the strength of the article, in particular the fatigue strength. Another field of application is the manufacture of products, which are required to be fully dense and to have pore-free surfaces, by means of compressing powder.

An article to be subjected to treatment by high-pressure pressing is positioned in a load compartment of a pressure chamber. After loading, the chamber is sealed off and a pressure medium, either a liquid or a gas, is introduced into the pressure chamber and the load compartment thereof. The pressure and temperature of the pressure medium is then increased, such that the article is subjected to an increased pressure and an increased temperature during a selected period of time. The heat is usually provided by means of a heating element or furnace arranged in a furnace chamber of the pressure chamber.

The pressures, temperatures, and treatment times are dependent on factors such as e.g. the material properties of the article to be treated, the field of application, the required quality of the treated article, and so on. The applied pressures and temperatures may typically range from 200 to 5000 bars and from 300 to 3000° C., respectively. When the pressing of the articles is finished, the articles often need to be cooled before being removed, or unloaded, from the pressure chamber.

A treatment of articles by high-pressure pressing is expensive, particularly the cost related to the residence time of the articles in the pressure chamber. Therefore, there has been a strive for providing a more efficient heating and cooling of the articles such to reduce the treatment times, still meeting the demands of the heating and cooling properties such as e.g. temperature gradients within specific limits.

To achieve an improved heating and cooling of the articles in the pressure chamber, it is preferred to circulate the pressure medium in the chamber. This circulation may be performed with our without mechanical aids. When used without mechanical aids, heat convection and re-distribution is provided due to existing or promoted temperature differences, as e.g. outer wall heating or cooling. Thus, the circulation is based on the observation that cooler fluid flows downwards and warmer fluid rises.

An example of such an heat convection high-pressure press is disclosed in patent document DE3833337. However, a problem related to this arrangement is that the heat circulation, related to the circulation of pressure medium, is difficult to control.

To overcome this problem, mechanical aids, such as a fan, may be used to improve the circulation of the pressure medium. In patent document U.S. Pat. No. 7,011,510, a pressure medium gas stirring fan is driven by a motor for promoting the temperature uniformity within the press chamber housing the articles.

Due to the high temperatures and the extreme pressures applied in a high-pressure press during operation, the equipment provided in the pressure chamber must meet high demands on durability, endurance, performance, and so on. This is especially the case for a motor provided in the pressure chamber, wherein the motor efficiency is susceptible for the high-pressure press conditions at operation. Thus, it is of important that a motor provided in a high-pressure press is arranged for the working conditions such that the service life of the motor is increased, thereby avoiding costly operation ruptures and/or troublesome maintenance.

However, a problem with the disclosed arrangement in the mentioned patent document is that the motor for driving the stirring fan is not suited for the high-pressure press working conditions. More specifically, the arrangement suffers from an unreliable motor operation, as the motor is liable to e.g. breakdowns and/or a low motor efficiency.

SUMMARY OF THE INVENTION

It is an object of the present invention to mitigate the above problems and to provide a high-pressure press that provides an improved operation of a motor within a press chamber during operation of the motor.

This and other objects are achieved by providing a motor system having the features defined in the independent claim. Preferred embodiments are defined in the dependent claims.

According to the present invention, this is realized by a high-pressure press comprising a high-pressure vessel enclosing a high-pressure chamber for holding articles to be pressed and a high-pressure medium, which high-pressure press chamber is arranged to be heated during operation of the high-pressure press, a housing having a housing wall, which housing is provided within the high-pressure press chamber for separating a volume from the high-pressure press chamber, which housing is arranged for holding a fluid, a fan arranged in the high-pressure press chamber outside the housing for circulating the high pressure medium in the high-pressure press chamber, a motor arranged in the housing, which motor is operatively connected to the fan for driving the fan, a cooling device arranged for cooling a portion of the housing wall, and a pumping device arranged for circulating the fluid within the housing passed the portion of the housing wall that is cooled by the cooling device and passed the motor, such that the fluid provides a transfer of cold from the portion of the housing wall to the motor for cooling the motor.

Thus, the high-pressure press of the present invention is based on the idea of providing a improved operation of the motor arranged in the press for circulating the high-pressure medium in the press chamber. To provide a suitable working condition for the motor in the high-pressure press, there is a need to cool the motor. This is realized by means of circulating a fluid within a housing in the high-pressure press chamber, in which housing the motor is provided. The pumping device, arranged for circulating the fluid within the housing, allows the fluid to transfer cold from the portion of the housing wall, which is cooled by the cooling device, to the motor. The housing limits the space for the fluid circulation in the press chamber. Furthermore, the housing separates the cooling operation of the motor from the press chamber. By this, a more effective cooling of the motor may be provided.

Thus, the present invention discloses an improvement of the operation of the motor in the press compared to the prior art. Consequently, several obstacles such as e.g. a deteriorated motor efficiency, supplementary repair costs and/or motor ruptures may be circumvented.

By "high-pressure press chamber", it is here meant a chamber subjected to pressure within the chamber during operation, such as e.g. a chamber of a hot isostatic press.

The housing provided within the high-pressure press chamber substantially separates the housing interior from the press chamber. This is advantageous as the space for the fluid circulation defined by the housing within the press chamber is limited by the housing. By this, the operation of the motor becomes more efficient.

The housing is arranged for holding a fluid. For the high-pressure press, this fluid may be a gas such as argon, nitrogen, or the like, which, under high pressure, is in a liquid state. As an example, the walls may be constructed such that any unwanted leakage of fluid through the housing walls may be avoided.

The term "housing" could, in this context, be construed a casing, an enclosure, a cover, or the like, such that the objects of the present invention are achieved. In an exemplifying embodiment of the present invention, the material of the housing is copper. However, any other material with similar properties to copper may be feasible embodiments.

The fan arranged in the high-pressure press chamber is provided outside the housing. The purpose of the fan is to improve the convection by a forced circulation of the pressure medium applied to the articles in the high-pressure press chamber. The fan may likewise be a centrifugal pump, turbine, a propeller, or the like, such that the object of circulating the pressure medium in the press chamber, outside the housing, is achieved.

The motor arranged in the housing is operatively connected to the fan for driving the fan. This implies that during operation of the motor within the housing, the fan arranged in the press chamber is also in operation. The term "operatively connected" may therefore be construed as a direct transmission of rotation from of a rotor within the motor to the fan, or an indirect transmission, from the motor to the fan via a motor shaft, or the like.

The motor may e.g. be an induction motor, or the like, known in the art, wherein a stator rotates a rotor during operation of the motor. However, a motor provided in a high-pressure press chamber subjected to high pressures and high temperatures may have additional features such that the motor becomes more adapted for the use in the press chamber.

According to an exemplifying embodiment of the present invention, the motor may be relatively flat such to optimize the space of the press chamber. This is advantageous considering that more space may be provided for the treatment of articles in the chamber. Alternatively, the press chamber may be made smaller, such to save costs related to the sometimes highly expensive materials often used in high-pressure vessel walls, such as e.g. molybdenum.

The motor components may be provided to withstand the high temperatures and extreme pressures that may be present in a high-pressure press chamber during operation. As an example, motor components such as rotors, stators, bearings, axes, and so on, may be overdimensioned and/or be provided in materials such that the motor is able to operate in the harsh press chamber conditions during operation. By this, the service life of the motor is even further increased which contributes to the operation of the high-pressure press.

The cooling device of the high-pressure press is arranged for cooling a portion of the housing wall. In other words, the cooling device transfers cold to the housing wall during operation such that the portion of the housing wall is cooled.

The cooling device of the motor system may e.g. be a block, a plate, or the like, through which a cooling medium may be led. The cooling device may be of any shape and size appropriate for the function of cooling a portion of the housing wall.

The cooling block and the housing wall may be in direct physical contact such that the transfer of cold may be provided directly from the cooling block to the housing wall. Alternatively, the cooling block and the portion of the housing wall may be separated. By this, the transfer of cold may be provided from the cooling block to the housing wall via a heat-conductive medium, element, or the like, such that the portion of the housing wall is cooled.

The term "housing wall" should, in this context, be construed as any part of the housing which defines the housing, i.e. a bottom, a side, a roof, or the like. The portion of the housing wall may be of arbitrary size, i.e. the portion of the housing wall may constitute a major part of the housing wall as well as a minor part of the housing wall.

The pumping device of the high-pressure press is arranged for circulating the fluid within the housing passed the portion of the housing wall that is cooled by the cooling block and passed the motor. Thus, the pumping device is arranged to provide a circulation of fluid within the housing passing the portion of the housing wall and the motor, and back to the portion of the housing wall during operation of the motor. By this, the pumping device circulates the fluid which provides a transfer of cold from the portion of the housing wall to the motor for cooling the motor.

An advantage with the pumping device is that it drives the fluid to circulate which ameliorates the fluid heat exchange, compared to a circulation arising from convection without any mechanical aids. Consequently, with the pumping device, cool is transferred more efficiently from the portion of the housing wall to the motor, thereby improving the cooling of the motor.

The portion of the housing wall, cooled by the cooling block, provides a transfer of cold to the fluid. The portion of the housing wall may therefore be a material having high heat conducting properties. This embodiment has the advantage that the transfer of cold from the cooling block to the fluid becomes more efficient.

The fluid passing the portion of the housing wall may be interpreted that the fluid passes the portion of the housing wall in such a way that the portion of the housing wall may provide a transfer of cold to the fluid. As an example, the fluid may pass in a close vicinity of the portion of the housing wall such that an even more efficient transfer of cold may be achieved.

Analogously, the fluid passing the motor may be interpreted that the fluid passes the motor in such a way that the fluid may provide a transfer of cold to the motor. As an example, the fluid may pass in a close vicinity of the motor, which even further improves the efficiency of the transfer of cold for cooling the motor.

The term "circulating" should, in this context, be construed that the pumping device is arranged to circulate the fluid within the housing interior to substantially return to a portion of the housing interior in a cyclic way. However, it should be noted that the circulation of fluid might be disrupted due to turbulence, convection, or the like.

The guidance of the fluid may be provided such that the structure of the housing circulates the fluid. As an example, the housing may be formed such that the fluid circulated by the pumping device is guided to optimize factors such as e.g. the position of the fluid within the housing, the flow rate of the fluid, and so on. By this, the passing of the portion of the housing wall and/or the passing of the motor may improve the transfer of cold from the fluid to the motor, when the fluid is circulated.

Alternatively, the fluid may be guided, for at least a portion of the circulation, by pipes, tubes, conduits, or the like, such to further control fluid circulation characteristics as e.g. the position and/or the flow rate of the fluid.

According to an embodiment of the invention, the pumping device is arranged in the housing, the pumping device being operatively connected to the motor.

An advantage of a pumping device arranged in the housing is that the efficiency of the circulation of fluid in the housing is improved, compared to e.g. a pumping device provided outside the housing.

The pumping device being operatively connected to the motor implies that the motor for operating e.g. a stirring fan for promoting the temperature uniformity within the press chamber, also drives the pumping device for the circulation of fluid in the housing. This further improves the function of the high-pressure press, as the motor simultaneously may drive the fan outside the housing and the pumping device in the housing. Therefore, any devices such as e.g. auxiliary motors provided for the rotation of the pumping device, the auxiliary motors being independently operated compared to the motor, may be omitted. This has the advantage of a high-pressure press which is cheaper, easier to manufacture, and less susceptible of costly and/or troublesome maintenance.

The term "operatively connected" may be construed that e.g. a rotation of a rotor within the motor drives the pumping device. The connection between the motor and pumping device may be direct, such that the angular frequency of the rotor of the motor linearly corresponds to the operational frequency of the pumping device. Alternatively, a gear device may be provided between the motor and the pumping device.

According to an embodiment of the invention, the cooling block is provided outside the high-pressure press chamber. Here, by "outside", it is meant that the cooling block is separated from the high pressure within the high-pressure press chamber during operation. This is advantageous as the cooling block may be sensitive to the conditions of high pressure and high temperatures in the press chamber during operation of the high-pressure press.

Furthermore, a cooling block provided outside the press chamber may more effectively conserve its temperature compared to a cooling block subjected to the high temperature environment of the press chamber in, e.g., a retention period of the press. Also, by avoiding a cooling block subjected to high pressure, the cooling properties of the cooling block may improve. As an example, a cooling medium subjected to high pressure increases its temperature, thereby deteriorating its cooling properties.

By this, deteriorating effects on the cooling block when pressurized such as a decreased cooling efficiency and/or a decreased service life may be avoided. Thus, by isolating the cooling block from the press chamber, an even more improved high-pressure press may be obtained.

According to an embodiment of the invention, the cooling device is comprised in a housing wall. As an example, the cooling device may be comprised in the bottom wall of the housing.

An advantage with the cooling device being comprised in a housing wall is that the transfer of cold from the cooling device to the housing wall is improved. This is realized when considering that a cooling block provided outside the housing wall may imply a loss of efficiency for the transfer of cold between the cooling block and the housing wall. Furthermore, the cooling device may be provided in a material such as copper, steel or the like, to further promote the transfer of cold to the housing wall.

According to an embodiment of the invention, the cooling block comprises a conduit arranged for conducting a cooling liquid such as cooling water or the like. By providing the conduit within the cooling block, the exposure of the conduit to pressure may be avoided. The advantage of the use of water is that it is cheap and easily accessible. The term "conduit" should, in this context, be construed as a pipe, a passage, a channel, a tube, or the like, such that a cooling liquid may pass through the conduit. As an example, the conduit may be an involute such like a curved, spiral form of the conduit. One advantage of such a structure is that the transfer of cold from the conduit is improved, as the involute provides for a relatively uniform transfer of cold to the cooling block.

The material of the conduit may be any material promoting the cooling block to provide a transfer of cold from the cooling block to the portion of the housing wall. Examples of such a material may be a heat conducting material such as copper, aluminum, steel, or the like.

According to an embodiment of the invention, the portion of the housing wall is at least partially enclosed by an insulating material such to thermally insulate the portion of the housing wall from the high-pressure press chamber. The term "insulating material" should, in this context, be construed as a material having a low heat conductivity such that the insulating material thermally separates the at least one portion of the housing from the chamber.

By this, the at least one portion of the housing may be isolated from e.g. a high temperature in the chamber. As an example, the chamber temperature adjacent the housing may be more than 300° C. during operation, whereas the temperature in the housing may be approximately 70° C. The insulating material may, for example, be provided in the walls and in the top of the housing. The insulating material may be ceramic fabric, ceramic fiber, glass fiber, or the like. These materials, or other of their kind, further improve the insulating properties of the portion of the housing wall such that a thermal separation between the portion of the housing wall and the chamber is provided.

According to an embodiment of the invention, the housing has an opening for allowing fluid communication between the housing and the high-pressure press chamber. The at least one opening may be a hole, a valve, a louver, or the like, for allowing a passage of fluid between the inside and the outside of the housing through the opening.

By allowing a fluid passage, the opening also promotes a pressure equalizing between the press chamber and the housing interior. As an example, if the pressure in the chamber is higher than the pressure in the housing interior, the high-pressure medium provided in the press chamber may pass into the housing interior such that the pressures of the chamber and the housing interior become more equal. Analogously, if the pressure in the housing interior is higher than the pressure in the press chamber, the fluid may pass from the housing interior into the chamber such that an equalizing of pressure between the press chamber and the housing interior is provided.

The opening of the housing to establish a pressure equalizing is desired when considering possible collapses or bursts of the housing due to pressure differences during operation of the chamber. As an example, if the pressure in the press chamber would be much higher than the pressure in the housing interior, an inability of the housing to establish a pressure equalizing could result in a collapse of the housing. Such a collapse could have serious consequences in terms of maintenance costs, operational disturbances, and so on. Analogously, if the pressure in the housing interior would be much higher than the pressure in the press chamber, the housing could burst, possibly leading to the same negative consequences such as previously mentioned.

The opening may be shaped such to provide a desired fluid communication between the housing and the press chamber. As an example, the opening may be made small or large, such to provide a high fluid velocity or a low fluid velocity at the opening.

According to an embodiment of the invention, the fluid in the housing is the same as the high-pressure medium in the high-pressure press chamber. This is advantageous considering that the same fluid may be used in the press chamber and in the housing. This implies that the high-pressure medium provided in the chamber applied on the articles may also serve as a fluid in the housing, provided for the cooling of the motor. Thus, the high-pressure press is simplified as any provision of an auxiliary medium for cooling the motor becomes superfluous.

According to an embodiment of the invention, a guiding element is provided within the housing for guiding the fluid when the fluid is circulated, the guiding element providing a passage between the guiding element and the housing wall and a passage between the guiding element and the motor, the passages allowing a passage for the fluid. Here, the guiding element should be construed as an element guiding the fluid to pass between the guiding element and the housing wall and between the guiding element and the motor.

Thus, the guiding element may improve the guidance of the circulating fluid such that an even more ameliorated cooling of the motor may be achieved. As an example, the shape of the guiding element optimizes the way the fluid comes into contact with the motor components. Moreover, the guiding element may shield the fluid close to the motor such to reduce unwanted turbulence or the like.

According to an embodiment of the invention, the guiding element is provided with an inlet at the base of the guiding element and an outlet at the top of the guiding element, the pumping device pumping the fluid from the inlet to the outlet during operation of the motor. By the inlet at the base of the guiding element and the outlet at the top of the guiding element, the guidance of fluid by the guiding element promotes an even more improved cooling of the motor, as the fluid is guided to pass a bigger portion of the motor. Furthermore, by pumping the fluid from the base to the top of the guiding element, e.g. in a vertical direction, the convection is even more improved. This is realized as fluid heated by the motor rises, driving the convection even more.

According to an embodiment of the invention, the guiding element is a casing, a housing, a cover, or the like, such that the objects of the present invention are achieved. In an exemplifying embodiment of the present invention, the material of the guiding element is steel. However, any other material with similar properties to steel may be feasible embodiments.

The guiding element further contributes to the cooling of the motor as it may substantially separate the temperatures between the guiding element interior and the housing interior. As an example, the housing temperature may be approximately 70° C. during operation, whereas the temperature in the guiding element may be approximately 150° C.

According to an embodiment of the invention, the motor comprises a rotor provided to rotate around an axis, and a stator at least partially enclosing the rotor in a plane perpendicular to the axis, wherein the stator is separated from the rotor and the guiding element in a plane perpendicular to the axis thereby forming a first passage between the stator and the rotor, a second passage between the stator and the guiding element, and a third passage between the stator windings, the first and second passages being parallel to the axis, and the third passage being perpendicular to the axis, the passages allowing a passage for the fluid, when the fluid is circulated.

Thus, the guiding element splits the fluid which is circulated by the pumping device to pass in a first passage between the stator and the rotor and in a second passage between the stator and the guiding element. Between the first and second passage, a third passage is provided for the fluid between the stator windings. As an example, the first passage and the second passage may be provided such that the direction of the fluid in the passages is substantially vertical. Analogously, the third passage may be provided such that the direction of the fluid in the passage is substantially horizontal.

With a cylinder-shaped rotor and a cylinder shaped stator enclosing the rotor, the first passage is defined by the outer radius of the rotor and the inner radius of the stator, thereby forming a cylinder with an outer and an inner radius. The distance between the stator and the rotor is optimized in a such a way that the passage of the fluid is wide enough to provide a cooling of the stator by allowing the passage of fluid during operation, still it is narrow enough to maintain the motor efficiency which is dependent on the distance between the stator and the rotor.

As an example of a guiding element and a motor in the high-pressure press, the guiding element may provide an inlet for the fluid at the base of the guiding element. When the pumping device is operated, a first portion of the fluid may pass from the inlet to pass in the vertical first passage between the stator and the rotor, through a loop connecting the first passage and the horizontal third passage at the top of the guiding element, pass in the third passage, to exit the guiding element through the outlet at the top of the guiding element.

Analogously, the guiding element and the motor may provide for a second portion of the fluid to pass from the inlet to the horizontal third passage at the base of the guiding element between the stator and the rotor, to pass in the vertical second passage, and to exit the guiding element through the outlet at the top of the guiding element.

According to an embodiment of the invention, the pumping device comprises a centrifugal pump, a fan, a turbine, a propeller, or the like. The term "pumping device" should, in this context, be construed as a device able to transport a fluid such that the object of circulating the fluid within the housing is achieved.

According to an embodiment of the invention, the high-pressure press chamber is a hot isostatic press chamber. In such a press chamber, the applied pressures and temperatures may typically range from 200 to 5000 bars and from 300 to 3000° C., respectively. The hot isostatic press chamber require components adapted for these conditions, and the high-pressure press as disclosed here meet these requirements.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION

In the following description, the present invention is described with reference to a high-pressure press.

Figure 1:
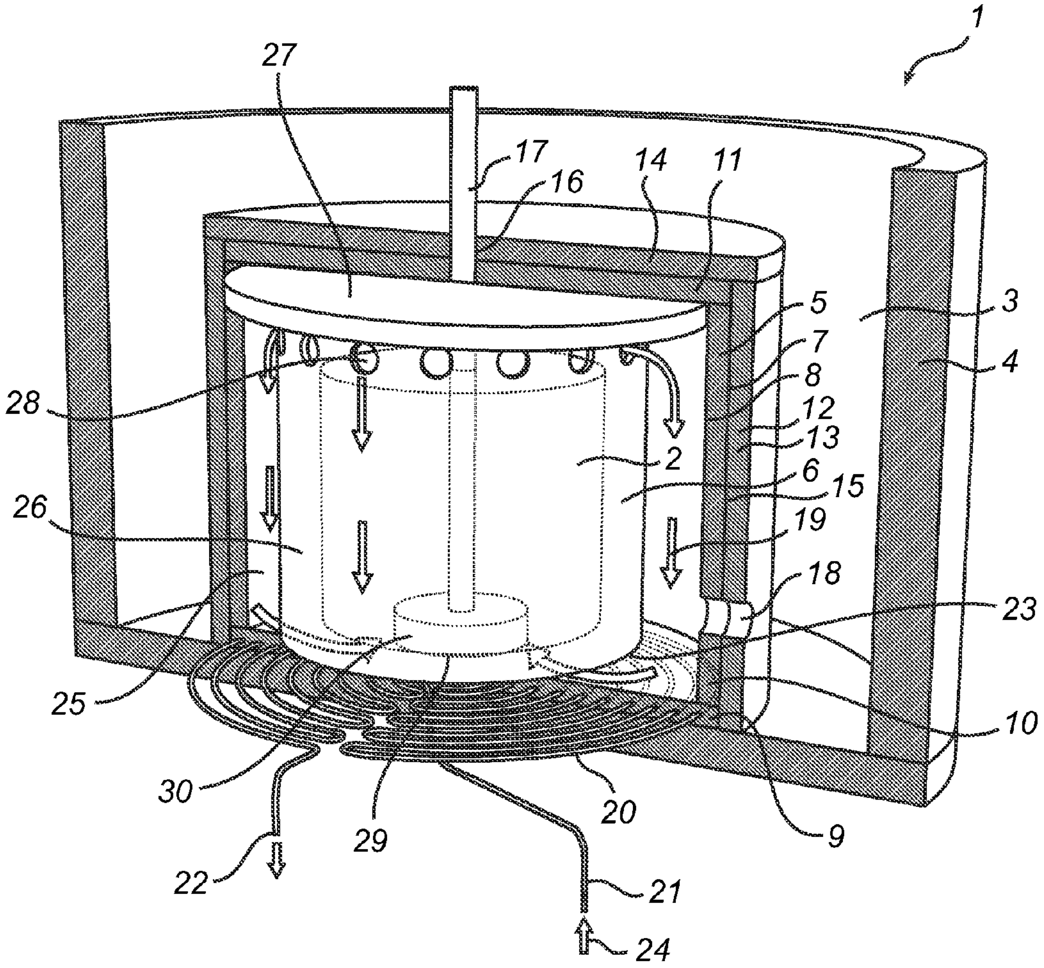
FIG. 1 shows a cross-sectional perspective view of the high-pressure press.

FIG. 1 shows a high-pressure press 1 wherein a motor 2, shown schematically as a cylinder with dotted borders, is provided in a press chamber 3. The cylinder-shaped press chamber 3 is defined by a pressure vessel 4, intended to be used for the pressing of articles. The pressure vessel 4 comprises devices (not shown) such as one or more ports, inlets and outlets, for supplying and discharging a pressure medium. The press chamber 3 comprises a housing 5 with a housing interior 6, the housing 5 being shaped as a cylinder having an outer radius 7 and an inner radius 8. The housing 5 is provided in the lower center portion of the press chamber 3. The housing 5 is provided with a bottom portion 9, a side portion 10 and a top portion 11.

An insulation 12, shaped as a cylinder having a side portion 13 and a top portion 14, encloses the side of the bottom portion 9, the side portion 10 and the top portion 11 of the housing 5. The radius of the inner portion 15 of the insulation cylinder 12 is substantially the same as the radius of the housing 5, such that the insulation cylinder 12 provides a tight cover for the housing 5. By this, the insulation 12 insulates the side portion 10 and the top portion 11 of the housing 5 from e.g. a high temperature in the press chamber 3. A person skilled in the art realizes that the insulation 12 of the housing 5 may be provided in any other way such to insulate the housing 5.

The top portion 11 of the housing 5 and the top portion 14 of the insulation 12 have a circular-shaped aperture 16 in their respective centers. By this, a vertical extension of a motor shaft 17 from the motor 2 is provided through the housing 5 and the insulation 12. During operation of the motor 2, the motor shaft 17 drives a fan (not shown) above the housing 5, such to provide a circulation of fluid medium in the press chamber 3.

Furthermore, a circular-shaped opening 18 is provided through the side portion 10 of the housing 5 and the side portion 13 of the insulation 12. The opening 18 thereby allows a fluid communication of a fluid medium 19 between the press chamber 3 and the housing interior 6. By this, a pressure equalizing between the press chamber 3 and the housing interior 6 is provided. Furthermore, the opening 18 allows the use of the same fluid medium 19 in the press chamber 3 and in the housing interior 6. The fluid medium 19 is preferably a gas, such as argon, nitrogen, or the like, in the liquid phase, but other media are also possible alternatives.

In the bottom portion 9, a pipe-shaped conduit 20 is provided, having an inlet 21 and an outlet 22. From the conduit inlet 21, the conduit 20 is provided as circles with decreasing radii towards the center of the bottom portion 9, such to form a spiral-shape. Then, from the center of the bottom portion 9, the conduit 20 is directed to the conduit outlet 22. During operation of the motor 2, a cooling medium 24 is conducted from the conduit inlet 20, through the spiral-shaped conduit 20, to the conduit outlet 22. In this way, the bottom portion 9 serves as a cooling device for the high-pressure press 1, as the conduit 20 transfers cold to the bottom portion 9.

Alternatively, instead of being positioned in the bottom portion 9 of the housing 5, the spiral-shaped conduit 20 may be positioned at another location, preferably separated from the exposure to high-pressure. As an example, the conduit 20 may be positioned in the side portion 10 of the housing 5. As another example, the conduit 20 may be positioned in the pressure vessel 4. The cooling medium 24 is preferably water, but other coolants are also contemplated.

In the housing interior 6, a guiding element 23 is provided, enclosing the motor 2, such that the guiding element 23 substantially separates the housing 5 from the motor 2. The guiding element 23 is shaped as a cylinder having an outer radius and an inner radius. By this, a cylinder-shaped portion 25 is provided in the housing interior 6, between the housing 5 and the guiding element 23. Furthermore, the guiding element 23 defines a cylinder-shaped guiding element interior 26. Both the portion 25 and the guiding element interior 26 allow the passage of a fluid medium inside the portion 25 and the guiding element interior 26.

On top of the guiding element 23, a top lid 27 is provided between the guiding element 23 and the top portion 11 of the housing 5. The top lid 27 is shaped as a disc with an outer radius larger than the outer radius of the guiding element 23. Thus, the guiding element 23 and the top lid 27 of the guiding element 23 together form the outer shape of an upside down cylinder hat.

At the top of the guiding element 23, under the top lid 27, a plurality of outlets 28 are provided through the guiding element 23, allowing a fluid communication between the guiding element interior 26 and the portion 25. The outlets 28 are provided horizontally around the guiding element 23, pointing radially outwards from the center axis of the guiding element 23.

At the base of the guiding element 23, an inlet 29 in the guiding element 23 is provided for allowing a fluid communication between the guiding element interior 26 and the housing interior 6. This means that during operation, a fluid medium 19 may enter the inlet 29 at the base of the guiding element 23, flow through the guiding element interior 26, and exit the guiding element 23 through the outlets 28. It should be noted that the outlets 28 may be provided in any other way such to provide a fluid communication between the guiding element interior 26 and the portion 25.

At the base of the guiding element interior 26, a centrifugal pump 30 (schematically shown) is fixed to the motor shaft 17. During operation of the motor 2, the rotation of the motor shaft 17 rotates the centrifugal pump 30. In the guiding element interior 26, the centrifugal pump 30 provides a flow of the fluid medium 19 from the base of the guiding element interior 26 towards the top of the guiding element interior 26.

Described more specifically, from the plurality of outlets 28, the centrifugal pump 30 provides a circulation of the fluid medium 19 in the portion 25 between the housing 5 and the guiding element 23 during operation of the motor 2. The circulation is directed from the top of the guiding element 23 downwards towards the inlet 29 of the guiding element 23. The provision of the outlets 28 around the guiding element 23 provides a uniform distribution of the fluid 19 from the guiding element 23. In this way, a circulation of the fluid 19 is provided by the centrifugal pump 30 through the guiding element interior 26, from the base to the top of the guiding element 23, via the portion 25 and back to the guiding element interior 26. Alternatively, the properties of the housing 5 and/or the guiding element 23 may be provided in any other way such to guide the circulation of the fluid medium 19.

A transport of the cooling medium 24 in the conduit 20 of the bottom portion 9 is provided to transfer cold from the bottom portion 9 to a portion of the housing 5. A person skilled in the art realizes that the portion of the housing 5 to which the cold is transferred may be of any size and positioned anywhere in the housing 5. Thus, the circulation of the fluid 19 may e.g. pass a large portion of the housing 5 or a small portion of the housing 5, respectively. As an example, the portion of the housing 5 to which the cold is transferred may be the bottom portion 9 of the housing 5.

Furthermore, the portion of the housing 5 provides a transfer of cold to the fluid 19 during operation of the motor 2. In this way, the circulating flow in the portion 25 is cooled when passing the portion of the housing 5. The cooled fluid 19 then enters the inlet 29 towards the centrifugal pump 30 during operation of the motor 2. In this way, the circulation of the fluid 19, passing from the guiding element interior 26, via the portion 25, and returning back to the guiding element interior 26, cools the motor 2. It should be noted that this transfer of cold may be provided in several different ways other than that shown in FIG. 1 such to provide a cooled circulation of the fluid 19 during operation of the motor 2.

Figure 2:
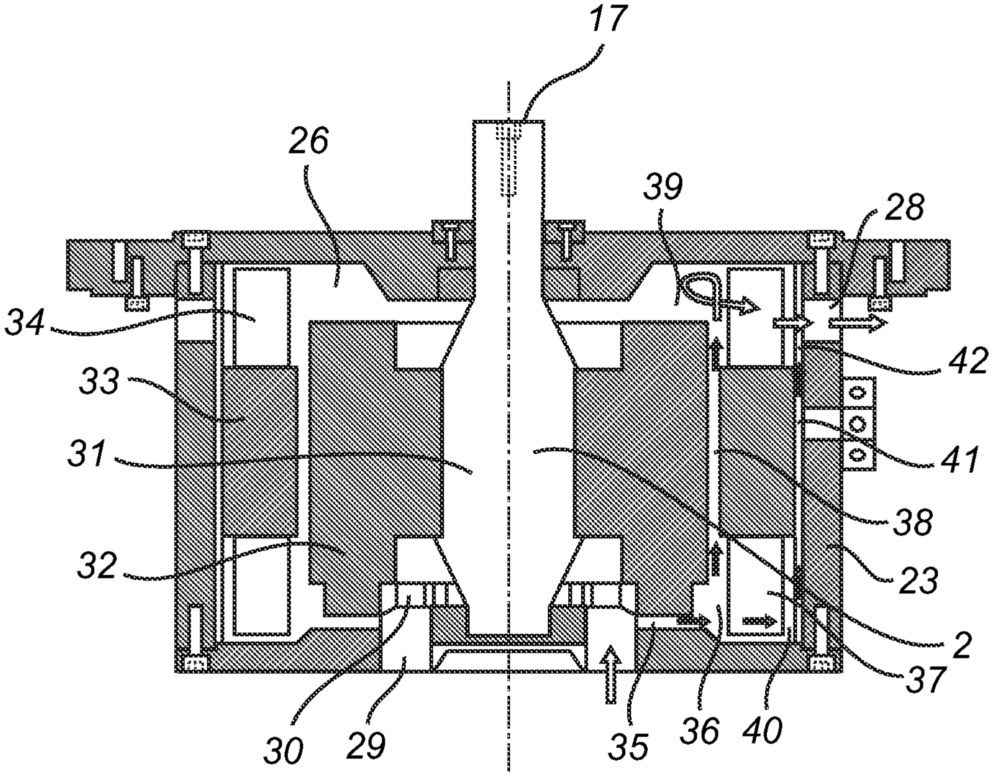
FIG. 2 is a cross-sectional view of the motor.

FIG. 2 shows a cross-sectional view of the motor 2 provided in the guiding element interior 26. The motor 2 has a rotor 31 provided in the center of the motor 2, the rotor 31 being fixed to the vertically elongated motor shaft 17. A rotor block 32 is provided around the motor shaft 17, wherein the rotor block 32 is shaped as a substantially cylindrical block. A stator 33, shaped as a cylinder, is provided around the rotor 31. A plurality of stator windings 34 are provided around the stator 33, such to form a electromagnet during operation. The function of the motor 2 and the relative positions of the components of the motor 2 such as e.g. the rotor 31, the stator 33 and the stator windings 34 are known in the art, and a more detailed description thereof is omitted.

However, for the purposes of the motor 2 in the high-pressure press, it should be noted that the motor 2 may be relatively flat such to optimize the space of the press chamber 3. This is advantageous considering that more space may be provided for the treatment of articles in the press chamber 3. Alternatively, the press chamber 3 may be made smaller to save costs related to the sometimes highly expensive materials, such as e.g. molybdenum, which often is used in the production of press chambers.

Furthermore, the motor components such as the rotor 31, the stator 33, bearings, axes, and so on, may be provided such to withstand the high temperatures and extreme pressures that may be present in the press chamber 3 during operation. As an example, the mentioned components may be overdimensioned and be provided in materials such that the motor 2 is able to operate in the harsh chamber conditions during operation.

The centrifugal pump 30 is provided at the base of the guiding element 23, adjacent the inlet 29 of the guiding element 23. A conduit 35, provided between the rotor block 32 and the base of the guiding element 23, extends from the centrifugal pump 30 to a first portion 36 provided between the rotor block 32 and a first portion 37 of the plurality of stator windings 34 at the base of the guiding element 23.

From the first portion 36, a first vertical passage 38 extends to a second portion 39 provided between the rotor block 32 and a the plurality of stator windings 34 at the top of the guiding element 23. Thus, the first vertical passage 38 is provided between the stator 33 and the rotor block 32.

A third portion 40 is provided between the first portion 37 of the plurality of stator windings 34 at the base of the guiding element 23 and the guiding element 23. From the third portion 40, a second vertical passage 41 extends to a fourth portion 42 provided between the plurality of stator windings 34 at the top of the guiding element 23 and the guiding element 23. The second vertical passage 41 is provided between the stator 33 and the guiding element 23.

At the top of the guiding element 23, an outlet 28 is provided through the guiding element 23, providing a fluid communication between the fourth portion 42 and the housing interior 6.

During operation of the motor 2, the centrifugal pump 30 sucks the fluid medium 19 from the housing interior 6 through the inlet 29 of the guiding element 23. The centrifugal pump 30 exhausts the fluid medium 19 through the conduit 35 to the first portion 36. A first part of the fluid medium 19 flows from the first portion 36 through the first vertical passage 38, via the second portion 39, flows in a loop in the second portion 39, flows through the plurality of stator windings 34, and exits the guiding element 23 at the outlet 28.

Analogously, a second part of the fluid medium 19 flows from the first portion 36 between the first portion 37 of the plurality of stator windings 34, through the second vertical passage 41, and exits the guiding element 23 at the outlet 28.

In this way, the fluid medium 19 from the inlet 29 is split from the first portion 36 into a first portion and a second portion of the fluid medium 19 which are then merged at the outlet 28. Thus, through the guiding element interior 26, the two portions pass the outside and the inside of the stator 33 to cool the stator 33.

Preferably, the centrifugal pump 30 is provided at the base of the guiding element interior 26 as the fluid medium 19, warmed by the motor 2, rises, such to further drive the convection.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

As an example, any device or element described may be realized in, practically, any other shape and/or size. The cylinder-shaped housing 5 and guiding element 23 may, instead, take on any other form, such as rectangular parallelepipeds, or the like. Moreover, the shape and/or size relationship between the housing 5 and the guiding element 23 may be provided in such a way to form a different circulation of the fluid 19.

Alternative shapes may also be provided for the plurality of outlets 28 which may be triangular-shaped, square-shaped, or the like. The spiral-shaped conduit 20 may instead be provided as a grid, a plate, or the like, such to generate the required cooling effect.

Furthermore, the circulation of the fluid medium 19 may be guided in another way by e.g. a different positioning of the plurality of outlets 28 and the inlet 29.

The invention claimed is:

1. A high-pressure press, comprising:

a high-pressure vessel enclosing a high-pressure chamber for holding articles to be pressed and a high-pressure medium, the high-pressure press chamber being arranged to be heated during operation of the high-pressure press;

a housing including a housing wall, the housing being provided within the high-pressure press chamber for separating a volume from the high-pressure press chamber, the housing being arranged for holding a fluid;

a fan arranged in the high-pressure press chamber outside the housing for circulating the high pressure medium in the high-pressure press chamber;

a motor arranged in the housing, the motor being operatively connected to the fan for driving the fan;

a cooling device arranged for cooling a portion of the housing wall; and a pumping device arranged for circulating the fluid within the housing, the fluid passing a portion of the housing wall that is cooled by the cooling device and passing the motor, such that the fluid provides a transfer of cold from the portion of the housing wall to the motor for cooling the motor, wherein the cooled circulation of the fluid within the housing is separated from the high-pressure press chamber by the housing.

2. The high-pressure press as claimed in claim 1, wherein the pumping device is arranged in the housing, the pumping device being operatively connected to the motor.

3. The high-pressure press as claimed in claim 1, wherein the cooling device is provided outside the high-pressure press chamber.

4. The high-pressure press as claimed in claim 3, wherein the cooling device is comprised in the housing wall.

5. The high-pressure press as claimed in claim 4, wherein the cooling device comprises a conduit arranged for conducting a cooling liquid.

6. The high-pressure press as claimed in claim 1, wherein the portion of the housing wail is at least partially enclosed by an insulating material to thermally insulate the portion of the housing wall from the high-pressure press chamber.

7. The high-pressure press according to claim 1, wherein the housing includes an opening for allowing fluid communication between the housing and the high-pressure press chamber.

8. The high-pressure press as claimed in claim 7, wherein the fluid in the housing is the same as the high-pressure medium in the high-pressure press chamber.

9. The high-pressure press according to claim 1, wherein a guiding element is provided within the housing for guiding the fluid when the fluid is circulated, the guiding element providing a passage between the guiding element and the housing wall and a passage between the guiding element and the motor, the passages allowing a passage for the fluid.

10. The high-pressure press according to claim 1, wherein the guiding element is provided with an inlet at a base of the guiding element and an outlet at a top of the guiding element, the pumping device pumping the fluid from the inlet to the outlet during operation of the motor.

11. The high-pressure press as claimed in claim 10, wherein the guiding element is a casing, a housing, or a cover.

12. The high-pressure press according to claim 9, wherein the motor comprises a rotor provided to rotate around an axis, and a stator at least partially enclosing the rotor in a plane perpendicular to the axis, wherein the stator is separated from the rotor and the guiding element in a plane perpendicular to the axis thereby forming a first passage between the stator and the rotor, a second passage between the stator and the guiding element, and a third passage between the stator windings, the first and second passages being parallel to the axis, and the third passage being perpendicular to the axis, the passages allowing a passage for the fluid, when the fluid is circulated.

13. The high-pressure press according to claim 1, wherein the pumping device comprises a centrifugal pump, a fan, a turbine, or a propeller.

14. The high-pressure press according to claim 1, wherein the high-pressure press chamber is a hot isostatic press chamber.

* * * * *